UNITED STATES PATENT OFFICE.

GUSTAVE TÜSCHEL, OF ODESSA, RUSSIA.

PROCESS OF PRIMING ARTICLES OF FURNITURE AND THE LIKE.

No. 796,775. Specification of Letters Patent. Patented Aug. 8, 1905.

Application filed July 8, 1904. Serial No. 215,702.

*To all whom it may concern:*

Be it known that I, GUSTAVE TÜSCHEL, tradesman, a subject of the Russian Emperor, residing at Odessa, Russia, have invented a new and useful Improvement in Processes of Priming Articles of Furniture and the Like; and I do hereby declare the following to be a full, clear, and exact description of the same.

This invention relates to a new or improved process of priming or grounding articles of furniture, whereby a speedy and durable polish is enabled to be imparted to articles of furniture or the like.

In carrying out this invention I proceed in the following manner: Five hundred grams of white Russian stick glue are thoroughly boiled in two thousand grams of water until the glue becomes entirely liquid. This liquid is twice filtered and then mixed with fifty-five grams of ground white stone, as white limestone or any desired white stone. One layer of the mixture thus obtained is put on the article to be primed or grounded with the aid of a brush of white wood, and after such layer has been allowed to thoroughly dry the respective surface of the article in question is ground, rubbed, or smoothened with glass or sandpaper or pumice-stone. After such operation the surface in question is coated a second time with the above-described mixture, and when this layer or coat has been allowed to dry is treated in the same manner as before. The surface thus treated is thereupon well rubbed with a woolen cloth until a dead or dull polish is obtained. I obtain in this manner a speedy and perfect polish, which proves to be extremely durable and weatherproof and will never show any flaws or become rough. In order to impart to the furniture a mahogany-like appearance, I proceed in the same manner, with the difference that the white stone is replaced by ground red brick, which is also made use of in cases in which a black or brown polish is desired to be obtained. For the purpose of polishing carriages and the like the respective surfaces are treated four times instead of twice in the manner hereinbefore described. In order to polish the surfaces thus treated, I take, for example, forty-five grams of red accroide resin and forty-five grams of yellow accroide resin. Both these substances are boiled together in water, whereupon the color is poured off the liquid thus boiled, and the accroide is allowed to dry for twenty-four hours. With this substance are then mixed seventy grams of ground Manila copal, and this mixture after being boiled in a suitable vessel until it becomes quite liquid is poured out upon a marble slab for the purpose of cooling. When it has properly cooled off, it is allowed to dry for twenty-four hours. The mixture thus dried is shaken for six hours (until it is completely dissolved) in a bottle or the like with twelve hundred grams of methylated spirit of 0.950 specific gravity and then allowed to stand for three days. This solution is filtered and receives an addition of ten grams of sulfuric ether. A material for a natural polish for all brown articles of furniture is in this manner obtained. When it is desired to impart to the furniture a black polish, an addition is made to the above-described mixture of thirty grams of black and three grams of blue anilin soluble in spirit. For obtaining a mahogany polish I use thirty grams of Bismark brown.

The articles of furniture grounded or primed and polished in the hereinabove-described manner have a durable polish and will never show any flaws in damp rooms.

Having thus described the nature of my invention, what I claim is—

The process of grounding or priming articles of furniture or the like, consisting in first coating the article with a sizing composition, then after the coating has dried, grounding or smoothening the same, then applying a second sizing-coating, and after it has dried grounding or smoothening the same, then rubbing to obtain a dull polish, and subsequently applying a coating mixture containing red accroide resin, yellow accroide resin, Manila copal, methylated spirit and sulfuric ether.

In testimony whereof I have signed this specification in the presence of two subscribing witnesses.

GUSTAVE TÜSCHEL.

Witnesses:
 M. CARLOS KREBS,
 T. LUTHWIN GÖBEL.